Patented Jan. 20, 1925.

1,523,755

UNITED STATES PATENT OFFICE.

HARRY O. CHUTE, OF NEW YORK, N. Y.

PRODUCTION OF VULCANIZED-RUBBER PRODUCTS.

No Drawing.  Application filed December 21, 1922.  Serial No. 608,356.

*To all whom it may concern:*

Be it known that I, HARRY O. CHUTE, a citizen of the United States, residing at New York, in the county of New York and State of New York, have invented certain new and useful Improvements in the Production of Vulcanized-Rubber Products, of which the following is a specification.

This invention relates to the production of vulcanized rubber products and it comprises a method of compounding raw rubber with vulcanizing substances and matter of proteid nature, such as glue or stick, which has been plasticized with a non-aqueous solvent body capable of dissolving both the protein and the rubber or chemically active in vulcanization, such a body for example as various basic organic nitrogenous materials of the nature of the amines and particularly those of liquid nature like anilin, toluidin etc; all as more fully hereinafter set forth and as claimed.

For a long time it has been known that glue and other proteid compounds exerted a favorable influence in the production of vulcanized rubber and it has become an ordinary practice to mix raw rubber and aqueous glue or its equivalent, the mixing being with the rubber on ordinary mixing rolls. The mixture was then sheeted and dried and the dried sheets used in the ordinary mixing.

I find a superior product is made if the protein is plasticized with a non-aqueous (water insoluble) solvent capable of acting upon both the rubber and the proteid matter and being itself a favorable factor in rubber compounds.

There are many substances such as phenols, creosotes, amines, guanidines, cyanamids and alkaloids which will combine with glue or other proteids in aqueous solution or under the influence of heat and will render non-aqueous glue plastic at the usual mixing temperature for rubber or below the vulcanizing temperature. Many of these solvents are in themselves accelerators of vulcanization but their action is enhanced by incorporation with proteid matter as described. A number of accelerators are either sticky, tarry, or poisonous, such as the compounds of acetaldehyde and anilin, quinoidine, paranitroso dimethylanilin, paraphenylenediamine and anilin. By incorporating into proteid matter they are easily handled in the rubber mixing without danger or inconvenience and more even distribution is assured.

It is well known that formaldehyde unites with glue to harden it and with amines such as anilin to form solid compounds. I do not find that this is advantageous in this described process but the higher aldehydes which form sticky or tarry compounds with amines and do not harden glue perceptibly may be advantageously used.

All kinds of proteid matter including the various glues and gelatines and albuminoids, such as blood albumen and casein may be used as the proteid matter, but I prefer to use the slaughterhouse product known as stick which as it occurs in commerce is a dark solid or semi-solid odorous and more or less decomposed product containing aminoacids and of gluey nature. It is produced in rendering the inedible parts of the carcass and is the residue left on boiling down the aqueous liquids from which the fats and solids have been removed. I find that stick, probably on account of its decomposed character has, when plasticized an accelerating effect in itself, even when the plasticizing agent is not an accelerator, but that when plasticized with an accelerating agent, anilin for example, the combination has greater influence than the two separately. In performing plasticization of the stick it is most convenient to use the concentrated aqueous solution produced commercially before the final drying but if the dried article only is available it may be first softened with water to an extent where a mixing machine will incorporate the plasticizing agents and the mixture is then dried by any convenient method. Dried proteids may be sometimes successfully plasticized by grinding more or less and incorporating the plasticizing agent by means of heat and stirring. If the plasticizing agents are volatile, drying may be done in a still with stirrer or by drying in an enclosed space with an attached condenser or other solvent recovery apparatus. If the proper proportions of plasticizing agents are mixed with the proteid matter the product is of a somewhat rubbery nature. If anilin has been used for example it goes into combination or reaction with the various components of the stick or other proteid producing compound materials of whose chemical nature practically nothing is known. Many of these compound materials are soluble in various rubber solvents, such as benzol or xylol, or are miscible with waxes or tars and pitches such as gilsonite. These solutions or mixtures may be used to further plasticize or soften a proteid where a large amount of proteid is desirable in the rubber product or where the accelerating action of the nitrogenous plasticizing agent is deemed too strong. Proteids such as glue, are mixed in certain compounds such as those used for tire treads to an amount equivalent to 20 per cent, or even more for their toughening and hardening effect; aside from any accelerating effect which they may have. The accelerator must be balanced with the proteid, according to the properties required in the vulcanized product.

Any or all of the usual compounding ingredients used with rubber, such as sulfur, zinc oxide, antimony pentasulfid, carbon black, clays, reclaimed rubber, factice, or other mixing ingredients may be compounded with rubber and a plasticized proteid matter without departing from the spirit of the present invention.

What I claim is:—

1. A vulcanizable compound comprising raw rubber, sulfur, and an anhydrous protein plasticized with a vulcanization accelerator body.

2. A vulcanizable compound comprising rubber, a vulcanizing agent, and a protein plasticized with a basic nitrogenous organic vulcanization accelerator.

3. A vulcanizable compound comprising rubber, a vulcanizing agent, and a partially decomposed protein plasticized with a basic nitrogenous organic vulcanization accelerator.

4. A vulcanizable compound comprising rubber, a vulcanizing agent, and stick plasticized with a basic nitrogenous organic vulcanization accelerator.

5. A vulcanizable compound comprising rubber, a vulcanizing agent, and stick plasticized with amines.

6. A vulcanizable compound comprising rubber, a vulcanizing agent, and stick plasticized with a non-aqueous body.

In testimony whereof, I have hereunto affixed my signature.

HARRY O. CHUTE.